United States Patent [19]

Kasai et al.

[11] Patent Number: 4,689,146

[45] Date of Patent: Aug. 25, 1987

[54] SYSTEM FOR DISSOLUTION-PURIFICATION OF Zn-CONTAINING MATERIALS

[75] Inventors: Tatsushi Kasai; Tatsuo Niikura; Masanori Sato, all of Tokyo; Takao Hashimoto; Akiya Yamashita, both of Ibaraki, all of Japan

[73] Assignees: Tsukishima Kikai Co., Ltd., Tokyo; Sumitomo Metal Industries, Ltd., Osaka, both of Japan

[21] Appl. No.: 813,105

[22] Filed: Dec. 24, 1985

[30] Foreign Application Priority Data

Dec. 28, 1984 [JP] Japan .............................. 59-275239
Dec. 28, 1984 [JP] Japan .............................. 59-275240

[51] Int. Cl.$^4$ ........................................... B01D 21/08
[52] U.S. Cl. .................................... 210/197; 210/199; 210/202; 210/219
[58] Field of Search .................. 75/108; 210/713, 738, 210/197, 199, 201, 202, 208, 219

[56] References Cited

U.S. PATENT DOCUMENTS

| | | | |
|---|---|---|---|
| 2,151,261 | 3/1939 | Bartlett | 210/199 |
| 2,348,123 | 5/1944 | Green et al. | 210/738 |
| 3,247,105 | 4/1966 | Gustafson | 210/713 |

Primary Examiner—Ivars Cintins
Attorney, Agent, or Firm—Flynn, Thiel, Boutell & Tanis

[57] ABSTRACT

A system for dissolution-purification of Zn-containing materials which comprises a dissolving means for dissolving the Zn-containing materials and an ion-exchanging means for separating heavy metal ions included in the solution resulting from the dissolving means. In these means, the liquid or slurry to be treated is subjected to the dissolution and ion-exchanging operation countercurrently and the treatment residue including impurities is separated from the liquid or slurry to be treated so as not to contaminate the liquid or slurry with impurities and to improve the solubility.

10 Claims, 6 Drawing Figures

FIG. 1

FIG. 2 out of system

SYSTEM FOR DISSOLUTION-PURIFICATION OF ZN-CONTAINING MATERIALS

BACKGROUND OF THE INVENTION

Field of the Invention

This invention relates to a system for dissolution-purification of Zn-containing materials, and more particularly to a system for purifying Zn-containing materials discharged from various plants of an iron mill etc. by dissolution of the Zn-containing materials through countercurrent contact with a dissolving liquid, to recover zinc carbonate ($ZnCO_3$)

Zinc oxide (ZnO) used as a vulcanization accelerator for tires, or for pigments, etc. is, generally, prepared by the dry process such as the American method or French method, or the wet process.

In this connection, it is to be noted that Zn-containing materials are discharged from various plants of iron mills etc. such as reduced iron manufacturing plant, a Zn-plating plant, or the like. These Zn-containing materials contain a considerable amount of zinc, and therefore, it is desired to effectively recover Zn from such Zn-containing materials.

If the dry process as mentioned above is applied to the preparation of ZnO from said Zn-containing materials, the resultant products are inevitably contaminated with several-thousand ppm of iron component and lead component originally included in the starting Zn-containing materials. In the case of the wet process, iron component in the Zn-containing materials is also dissolved in an amount of tens of thousands ppm, when the Zn-containing materials are subjected to dissolution in hydrochloric acid.

Even if the products contain several-tens of ppm of iron and/or lead, they may be used for some applications. However, it is desirable, in general, to reduce the iron or lead components and preferably to reduce the iron component to 10ppm or less and the lead content to 1 ppm or less.

The inventors of the present invention have previously proposed, in Japanese Patent Application Laid-Open (Kokai) No. 59-88319, a process for recovering Zn from Zn-containing materials.

This previously proposed process is an improvement of the wet process. This process is based on the fact that zinc is an amphoteric metal. The basic idea of this process is to contact the Zn-containing materials with a liquid to dissolve Zn and let impurities included in the Zn-containing materials be precipitated, and subject the filtrate, in from which the undissolved residue has been removed, to recover zinc carbonate in the form of $2ZnCO_3 \cdot 3Zn(OH)_2$ and/or $ZnCO_3 \cdot 3Zn(OH)_2$.

As described above, hydrochloric acid is used as a solvent in the conventional wet process. The starting material of the conventional wet process is metal powder, so that special treatment of impurities is not needed in the conventional process. However, in the previously proposed inventors' process, the starting materials are not pure Zn metal, but rather, are Zn-containing materials including at least Fe and Pb, such as kiln dust from a reduced iron preparing plant or a discharge from a Zn-plating plant. Therefore, the most important issue of that process is to remove the impurities such as Fe or Pb and to obtain a zinc carbonate containing minimized impurities.

To attain the task as mentioned above, according to the inventor's previous process, the ampholytic property of Zn is utilized. More specifically, a solution mixture of $NH_4OH$ and $(NH_4)_2CO_3$ or a solution mixture thereof to which is further added, according to necessity, ammonium thiocyanate ($NH_4SCN$) and/or ammonium sulfide $(NH_4)_nS$ is employed as a solvent, and the Zn-containing materials are dissolved in such a solution and then subjected to an appropriate post-treatment, thereby to effectively remove the impurities such as Fe and Pb.

In the process, however, additional steps such as air oxidation, metal zinc adding, filtration of iron oxides, or ion exchange are needed to minimize the Fe and Pb components in the products, because Fe and Pb are also dissolved in the basic ammonium carbonate solution when the Zn-containing materials are dissolved in the solution. Thus, the process is not economical.

Therefore, it has been desired to provide a process which is capable of minimizing the post-treatment after the dissolution of the Zn-containing materials and further reducing the Fe and Pb contents in the products.

On the other hand, it has been found by the inventors that when the Zn-containing materials as mentioned above are dissolved in the basic ammonium carbonate solution, such an arrangement, where a plurality of simple dissolving tanks or tanks with clarifying portions are simply disposed sequentially, has the following problems.

The Zn-containing dust is reacted with the above-mentioned solution as follows:

Dissolution Step $$Zn+(NH_4)_2CO_3+2NH_4OH\rightarrow Zn(NH_3)_4CO_3+H_2\uparrow +2H_2O \qquad (1)$$

The reaction generates hydrogen as is apparent from formula (1). In the case of the dissolution of the materials which does not cause gas generation, it is possible to employ the conventional dissolution process. However, in the case of the dissolution which causes hydrogen gas generation, the starting Zn-containing materials, which are fed in the form of dust, are hardly precipitated but are liable to be moved upwardly by bubbles of the generated gas so as to float on the surface of the solution. Thus, there is not obtained a precipitated concentrate portion, and undissolved residue overflows into the succeeding tank. The solubility is accordingly decreased and the resultant products will be contaminated with considerable amounts of Fe and Pb. Furthermore, if the undissolved residues are not sufficiently precipitated, the major portion thereof should be returned to the preceding tank for re-dissolving the same. In this case, the differences in dust concentration between the tanks become small and it becomes difficult to obtain a pure zinc solution.

It has also been known to the inventors that to provide steps of ion exchange and crystallization after the above-mentioned dissolution step is desirable to effectively remove the impurities. The reactions of these steps are as follows:

Ion-exchange Step $$Me^{2+}+Zn\rightarrow Me\downarrow+Zn^{2+} \qquad (2)$$

Crystallization Step $$5Zn(NH_3)_4CO_3 + 3H_2O \rightarrow 2ZnCO_3 \cdot 3Zn(OH)_2 \cdot H_2O \uparrow + 3CO_2 \downarrow + 20NH_3 \quad (3A)$$

$$4Zn(NH_3)_4CO_3 + 4H_2O \rightarrow ZnCO_3 \cdot 3Zn(OH)_2 \cdot H_2O \uparrow + 3CO_2 \downarrow + 16NH_3 \downarrow \quad (3B)$$

In this case, it may be presumed that 80 to 90% of the crystallization is carried out by the reaction 3B and the reaction 3A occurs to a minor extent.

Figure 6:
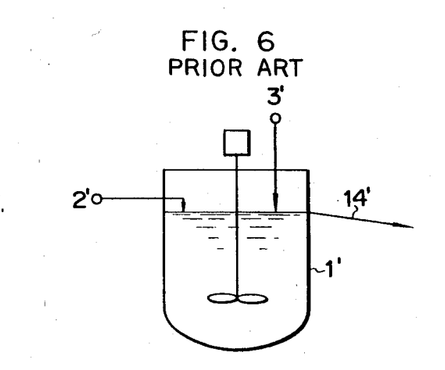
FIG. 6 is an explanatory view of a single ion-exchanging tank arrangement.

The ion-exchange step comprises feeding of metal zinc (powder) into the zinc solution to separate out heavy metal ions in the zinc solution as the dissolution of the metal zinc powder proceeds. To effect this operation, a single ion-exchanging tank 1' may be employed as shown in FIG. 6 so as to feed a zinc solution 2' into the tank 1', stir the solution and then feed metal zinc powder 3' into the solution for obtaining a purified solution 14'.

This method, however, has a shortcoming that the effect of removal of the impurities is not sufficient as can be seen from the Comparative Example as given later, and has a further drawback that the operation is not continuous, but rather, is batchwise.

It is an object of the present invention to provide a system for purifying Zn-containing materials through a dissolution operation, which is capable of surely removing impurities from the Zn-containing materials.

It is another object of the present invention to provide a system for purifying Zn-containing materials through a countercurrent dissolution operation which is capable of obviating problems involved in the inventors previous process, enabling preparation of the desired zinc compound having minimized impurities, while reducing the number of the post-treatments, and capable of solving the problems which would arise if the conventional dissolution operation is simply applied, to the Zn-containing materials, such as low solubility and contamination of the solution with impurities, enabling smooth dissolution and preparation of zinc solution having minimized impurities.

It is a further object of the present invention to provide a system for purifying a zinc solution which has a remarkable purification efficiency and enables a continuous operation.

SUMMARY OF THE INVENTION

In accordance with one mode of the present invention, there is provided a system for dissolution-purification of Zn-containing materials which comprises:

a dissolving means for dissolving the Zn-containing materials; and an ion-exchanging means for separating out, by dissolving metal zinc into the resultant solution, heavy metal ions included in the solution, onto the surfaces of metal zinc;

said dissolving means including a plurality of dissolving tanks disposed in series, a precipitating-separation tank provided at least after a final one of the dissolving tanks, the first dissolving tank being adapted to receive a dissolving liquid so as to transfer the resultant solution from said first dissolving tank to the final dissolving tank, and said final dissolving tank being adapted to receive the starting Zn-containing materials, and means for returning a slurry containing undissolved Zn-containing materials to the preceding dissolving tanks except for the precipitaion-separation tank and the first dissolving tank; and said ion-exchanging means including a plurality of ion-exchanging tanks each having a precipitating portion and clarifying portion and disposed in series, the first ion-exchanging tank having an inlet for the solution and the final ion-exchanging tank having an inlet for metal zinc, clarified liquid feeding paths for sequentially transferring resultant clarified liquids from the first ion-exchanging tank to the final ion-exchanging tank, and precipitate slurry returning paths for returning resultant precipitate slurries from the final ion-exchanging tank to the first ion-exchanging tank.

The present mode of the invention incorporates the features that a precipitating separating tank is provided at least after the final dissolving tank and it is used combination with the dissolving tanks so as to positively and surely separate and precipitate the undissolved Zn-containing materials from the solution thereof. This mode of the invention further incorporates the features that undesired substances are accumulated at an earlier stage so as to obtain a solution of less impurities at a later stage, according to the amount of the undesired substances transferred to the earlier stage. As a result of this, the final zinc solution can have extremely low impurity contents. For this purpose, the dissolving solution is introduced into the first dissolving tank while the starting Zn-containing materials are fed into the final dissolving tank, and the undissolved Zn-containing materials precipitated in the precipitating separating tank are returned to the preceding dissolving tank, thereby to constitute, as a whole, a countercurrent contact dissolution system.

Further according to this mode of the invention, a plurality of ion-exchanging tanks are provided in series so as to carry out sequential purification, and the zinc solution is fed into the first tank and the zinc metal is fed into the final tank so as to countercurrently contact the zinc solution with the zinc metal. By this, a continuous operation is enabled. Besides, the solution from which the heavy metal ions have been removed is brought into contact with fresh metal zinc, so that the purification efficiency is increased very much. In addition, the purification efficiency is further improved by the precipitating portion and the clarifying portion provided in each of the ion-exchanging tanks.

In accordance with another mode of the invention, there is provided a system for dissolution-purification of Zn-containing materials which comprises:

a dissolving means for dissolving the Zn-containing materials; and an ion-exchanging means for separating out, by dissolving metal zinc into the resultant solution, heavy metal ions included in the solution, onto the surfaces of metal zinc;

said dissolving means including a plurality of unit dissolving apparatuses each having a dissolving tank and a precipitating-separation tank succeeding thereto and disposed in series so as to transfer the solution sequentially, the dissolving tank of the first unit dissolving apparatus being adapted to receive a dissolving liquid and the dissolving tank of the final unit dissolving apparatus being adapted to receive the starting Zn-containing materials, and means for returning undissolved Zn-containing materials precipitated in the lower portions of the precipitating-separation tanks of the respective unit dissolving apparatuses other than the first unit dissolving apparatus, to the respectively preceding unit dissolving apparatus;

said ion-exchanging means including a plurality of ion-exchanging tanks each having a precipitating portion and clarifying portion which are disposed in series, the first ion-exchanging tank having an inlet for the solution and the final ion-exchanging tank having an inlet for metal zinc, a clarified liquid feeding path for sequentially transferring a resultant clarified liquid from the first to the final ion-exchanging tank, and a precipitate slurry returning path for returning a resultant precipitate slurry from the final to the first ion-exchanging tank.

DESCRIPTION OF THE PREFERRED EMBODIMENTS

The invention will now be described, referring to the drawings.

Figure 5:
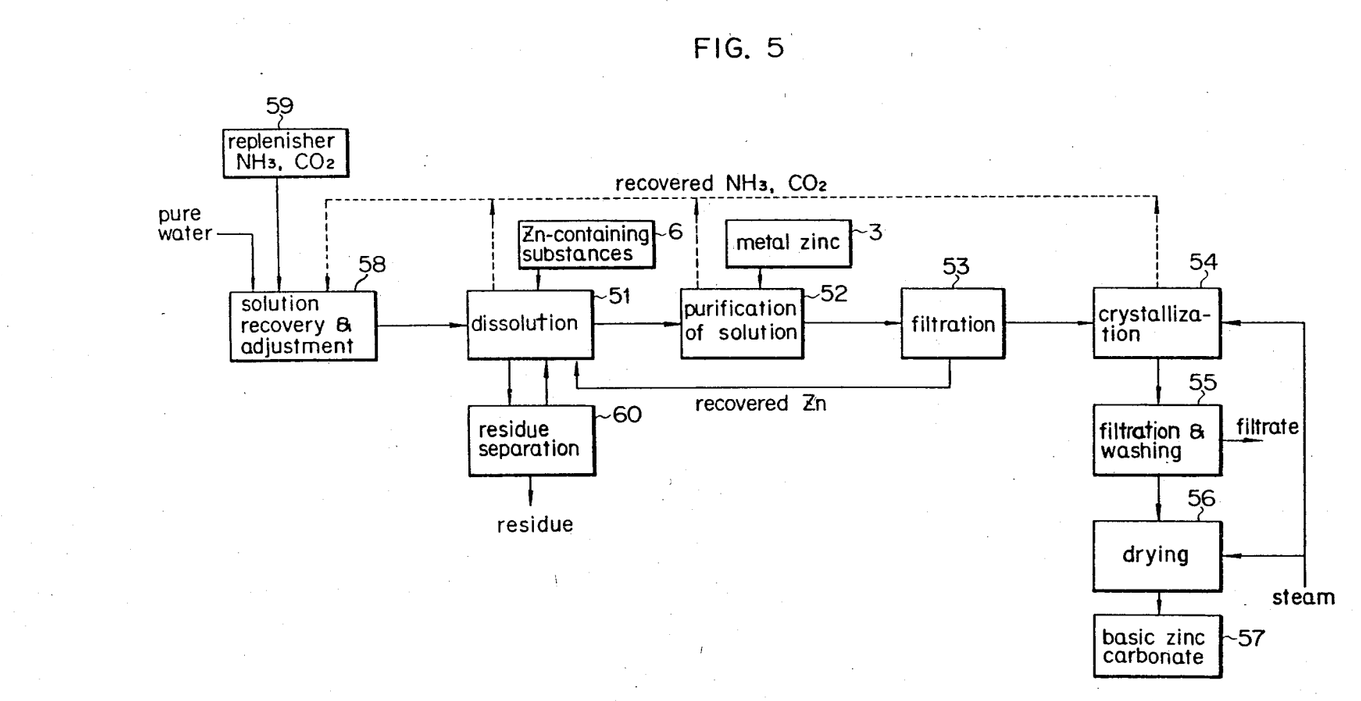
FIG. 5 is a block diagram of the entire system for recovering a zinc carbonate.

FIG. 5 illustrates an entire system for recovering a zinc carbonate. A dissolution step 51 includes, for example, three dissolving tanks for dissolving starting Zn-containing materials 6 and a precipitation separating tank succeeding the dissolving tanks. A solution purification step (ion-exchanging step) 52 includes, for example, three ion-exchanging tanks and a precipitation-separating tank. The solution resulting from the dissolution step 51 is introduced into the ion-exchanging step 52. Metal zinc powder 3 is added to to the final, i.e., third ion-exchanging tank and used for the ion-exchanging operation. Both the steps are carried out countercurrently.

The solution after the ion-exchanging step 52 is introduced to a crystallization step 54 through a precise filtration step 53. The crystallization step 54 includes, for example, four crystallizers and a distillation column. The resultant slurry is subjected to filtration by a filter 55 and then dried by a drier 56 to obtain a product 57.

On the other hand, vapor generated by the distillation column and comprising $CO_2$ gas, ammonia gas and steam is introduced from the first cystallizer to a solution adjusting apparatus 58, where $CO_2$ gas and ammonia 59 are added to adjust the concentration thereof to a required value and the so adjusted solution is returned to the dissolving tanks. Undissolved residues in the dissolving and ion-exchanging operations are discharged out of the system through a residue dissolving tank and a filter 60.

Figure 1:
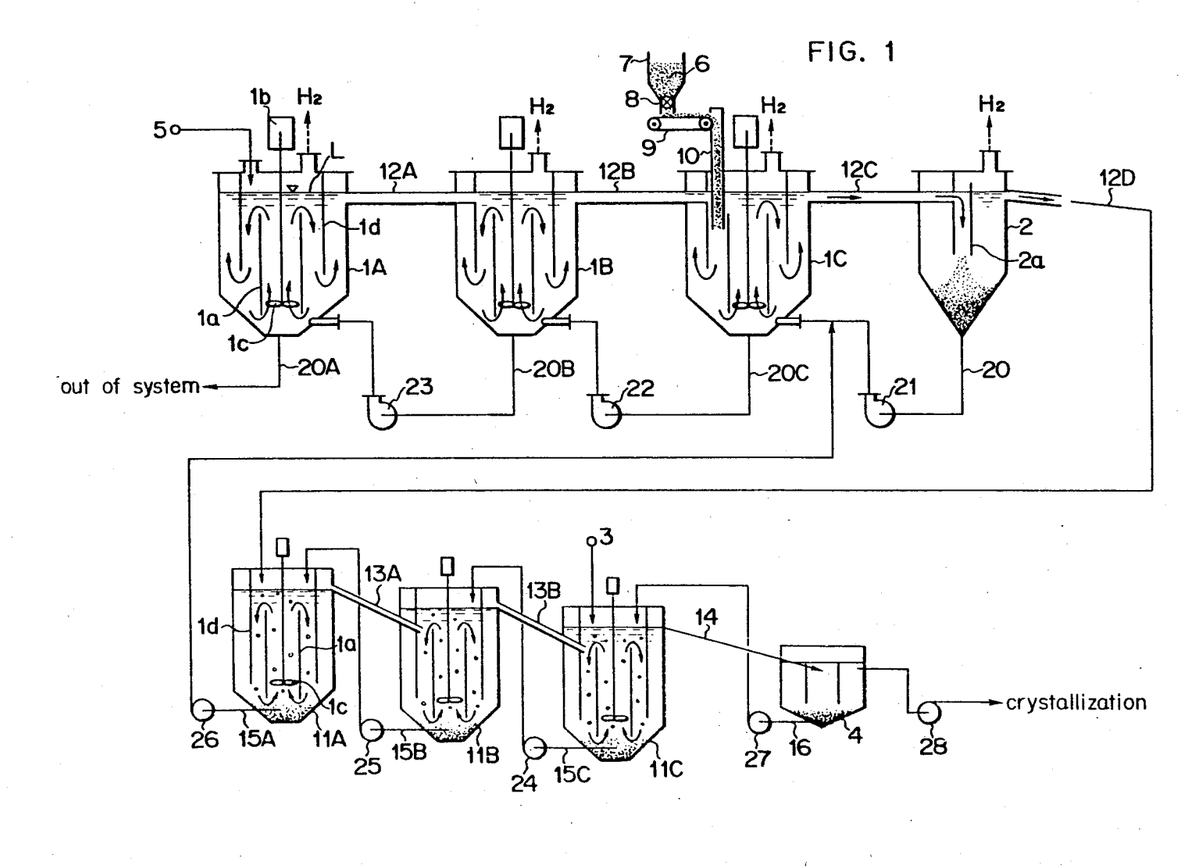
FIG. 1 is a schematic view of a system for dissolution-purification of Zn-containing materials according to the present invention.

FIG. 1 schematically illustrates a dissolution-purificating system of the present invention.

A dissolving means for the Zn-containing materials 6 comprises three, i.e., first to third dissolving tanks 1A to 1C and one precipitation-separating tank 2. Each of the dissolving tanks 1A to 1C includes a draft tube 1a having an upper end located just under the surface L of the solution and a lower end located just above the bottom of the tank, an agitator 1c disposed within the draft tube 1a and driven by a motor 1b and a baffle member 1d located between the draft tube 1a and the inner wall of the tank and extending from above the surface L of the solution to under the surface L. The baffle member 1d cooperates with the inner wall of the tank to define a clarifying portion therebetween.

An ion-exchanging means (solution purification means) for separating out, through dissolution of metal zinc powder supplied at 3, heavy metal ions contained in the solution resulting from the dissolving means, onto the surfaces of the metal zinc powder 3, comprises three ion-exchanging tanks 11A to 11C and one precipitation-separating tank 4. Each of the ion-exchanging tanks 11A to 11C is substantially the same, in structure, as that of each of the dissolving tanks 1A to 1C.

In the arrangement as described above, a dissolving liquid 5, for example, a solution mixture of $NH_4OH$ and $(NH_4)_2CO_3$ is introduced into the first dissolving tank 1A. The starting Zn-containing materials 6 is fed from a hopper 7 into a third dissolving tank 1C through a constant rate loader 8, a belt-conveyor 9 and a chute 10. The clarified liquid in the third dissolving tank 1C is fed into a central tube 2a of the precipitation-separating tank 2 through an overflow pipe 12C. The undissolved Zn-containing materials 20 precipitated to the bottom portion of the precipitation-separating tank 2 is returned, by a pump 21, into the third dissolving tank 1C.

Similarly, the undissolved Zn-containing materials 20C, 20B of the third dissolving tank 1C and the second dissolving tank 1B, respectively, are returned to the respectively preceding dissolving tanks 1B and 1A by pumps 22 and 23, respectively. The undissolved Zn-containing material 20A of the first dissolving tank 1A is discharged out from the system for disposal or further treatment.

On the other hand, the first dissolving tank 1A receives the dissolving liquid 5 and further receives the Zn-containing materials 20B returned from the succeeding dissolving tanks to dissolve the latter. The clarified solution is transferred to the succeeding second dissolving tank 1B through the overflow pipe 12A. In turn, the second dissolving tank 1B receives the clarified solution from the first dissolving tank 1A to dissolve the undissolved Zn-containing materials 20C returned from the third dissolving tank 1C. The clarified portion is transferred to the third dissolving tank 1C through an overflow pipe 12B.

Hydrogen gas generated in the dissolving tanks 1A to 1C and the precipitaion-separating tank 2 is discharged from upper outlets, respectively.

According to the feeding mode of the solvent liquid 5 and the Zn-containing materials 6 as described above, the Zn-containing materials are fed into the final dissolving tank 1C and the solvent liquid 5 is fed into the first dissolving tank 1A, and the solvent liquid 5 and the Zn-containing materials 6 are let to flow countercurrently. As a result, the Zn-solution discharged from the precipitation-separating tank 2 contains the least impurities such as Fe, Pb, whereas the liquid in the first dissolving tank 1A has the largest impurities contents. Thus, the contamination of the Zn-solution transferred from the dissolving means to the ion-exchanging means is not so much.

In the ion-exchanging means, preferably about 35 to 100 $\mu$ of metal zinc powder 3 is fed to a reaction zone within the baffle member 1d the third ion-exchanging tank 11C. The clarified solution of the dissolving means is fed from the precipitation-separating tank 2 to the first ion-exchanging tank 11A through an overflow pipe 12D. The resultant clarified solution of the first ion-exchanging tank 11A is fed to the reaction zone of the second ion-exchanging tank 11B through a feeding path 13A, the clarified solution of the second ion-exchanging tank 11B is fed to the reaction zone of the third ion-exchanging tank 11C through a feeding passage 13B, and the clarified portion of the third ion-exchanging tank 11C, i.e., purified solution 14 is supplied to the precipitation-separating tank 4.

On the other hand, the metal zinc slurries precipitated in the bottoms of the third to the first ion-exchanging tank 11C to 11A are returned to the reaction zones of the respectively preceding tanks through return paths 15C and 15B, respectively. 24, 25, 26 are pumps for returning the metal zinc slurries. The slurry of the first ion-exchanging tank 11A is preferably returned to the preceding dissolution step, for example of the third dissolving tank 1C through a return path 15A.

As illustrated in FIG. 1, it is preferred to introduce the purified solution 14 to the precipitation-separating tank 4 to increase the separation efficiency. The resultant precipitation slurry 16 is preferred to be returned to the third ion-exchanging tank 11C by a pump 27. The clarified liquid 17 of the precipitation-separating tank 4 is introduced to the succeeding crystallization step by a pump 28.

In the purification step as described above, when the metal zinc is dissolved in the zinc solution, the metal ions in the zinc solution are separated out onto the surfaces of the metal zinc and removed from the zinc solution. In this case, the zinc solution is brought into contact with the metal zinc slurry countercurrently and the zinc solution, wherein the metal ions have been reduced, is contacted by fresh metal zinc. By this reason, the purification efficiency is remarkably increased.

Since the reaction region is defined by the baffle member 1d and the metal zinc is circulated, the feeding amount of the metal zinc may be reduced, while assuring a reaction area several times as large as the feeding amount if the ion-exchanging reaction region retains a considerable amount of the metal zinc. The reaction area several times as large as the feeding amount can be obtained. In general, it is preferred that the feeding amount of the metal zinc be 5 to 10 kg/Hr, the return amount be 100 to 200 ml/Hr and the drawing-out amount of the purified solution be 0.9 to 0.8 m$^3$/Hr, for 1 m$^3$/Hr of zinc solution feeding amount.

Although three ion-exchanging tanks are provided in the embodiment as illustrated, the number of the tanks is not limited thereto so long as it is plural. Another precipitation-separating tank may be provided, according to necessity, between the ion-exchanging tanks.

Figure 2:
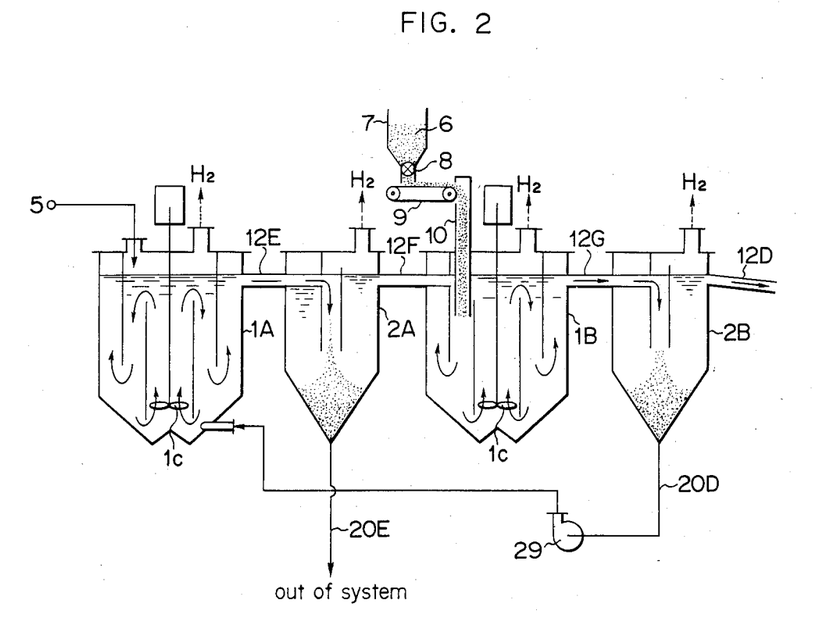
FIGS. 2 and 3 are schematic views of modified forms of dissolution means, respectively.

FIG. 2 illustrates another form of the dissolving means of the present invention, wherein two sets of unit dissolving apparatuses each comprising the dissolving tank and the precipitation-separator are employed. The first dissolving tank 1A, the first precipitation-separating tank 2A, the second dissolving tank 1B and the second precipitation-separating tank 2B are disposed in the sequence.

The starting Zn-containing materials 6 are fed into the second dissolving tank 1B and the undissolved Zn-containing materials in the second precipitation-separating tank 2B are returned to the first dissolving tank 1A by a pump 29. The undissolved Zn-containing materials 20E in the first precipitation-separating tank 2A are discharged from the system. The clarified solutions obtained in the respective tanks 1A, 2A, 1B and 2B are introduced sequentially to the tanks 2A, 1B, 2B and 11A, respectively through pipes 12E, 12F, 12G and 12D.

In this embodiment, a Zn-solution obtained has a low impurity contents as in the foregoing embodiment.

Figure 3:
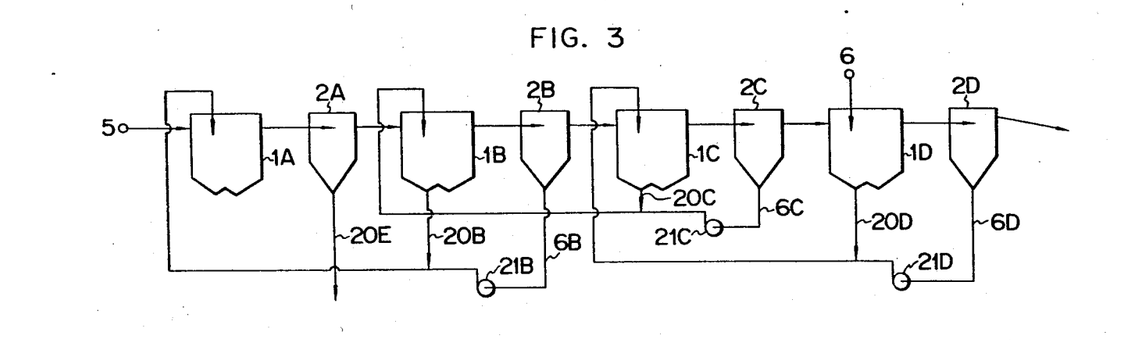

FIG. 3 illustrates a still further form of the dissolving means. In FIG. 3, four sets of the unit dissolving apparatuses A to D are provided. The dissolving liquid 5 is fed into the first dissolving tank 1A, the starting Zn-containing materials 6 is fed into the fourth dissolving tank 1D and the undissolved residues in the second to the fourth precipitation-separating tanks 2B to 2D are drawn out from the botoms of the respective tanks and returned, by returning pumps 21B to 21D, to the first to the third dissolving tanks 1A to 1C of the respectively preceding unit dissolving apparatuses. The undissolved materials 20E in the first precipitation-separating tank 2A is discharged from the system.

In the embodiments as illustrated in FIGS. 2 and 3, if considerable amounts of the undissolved materials are precipitated in the bottoms of the dissolving tanks, they may be returned to the respectively preceding tanks through pipes 20D, 20C and 20B, respectively.

Figure 4:
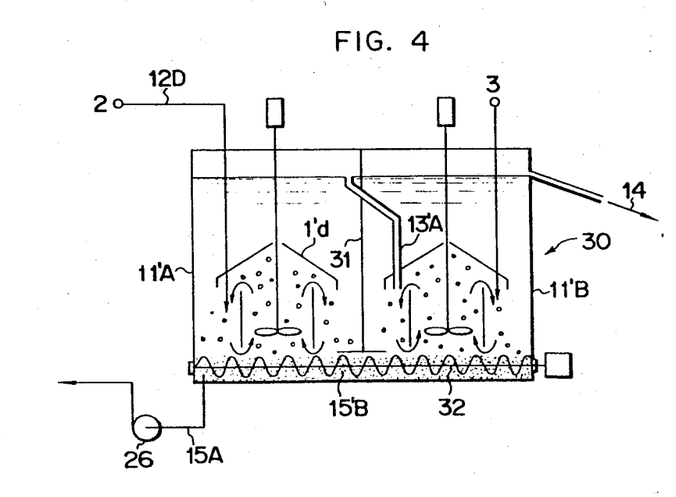
FIG. 4 is a schematic view of another form of ion-exchanging means.

FIG. 4 illustrates another form of the ion-exchanging means. In this case, an ion-exchanging tank 30 is divided, by a partition 31, into two ion-exchanging tanks 11'A, 11'B. A feeding passage 13'A is provided through the partition 31 and a screw-conveyor 32 is used to form a returning path 15'B. The configuration of the baffle member 1'd is modified. The operation is substantially the same as that of the ion-exchanging means as described before.

As the dissolving liquid for dissolving zinc, an aqueous solution containing at least $NH_4OH$ and $(NH_4)_2CO_3$ is preferably employed. Ammonium thiocyanate $NH_4SCN$ or ammonium sulfide $(NH_4)_nS$ may be added to the dissolving solution. Ammonium thiocyanate or ammonium sulfide is suitable for removal of the Pb and, when ammonium thiocyanate is added, the Pb content can be reduced to 0. This is suitable for recovering of a zinc compound used for applications where Pb content is not desirable. $NH_4OH$ and $(NH_4)_2CO_3$ are used in combination. If only one of these chemicals is used, the solubility of zinc is not sufficient. For instance, if $NH_4OH$ is used in combination with $NH_4SCN$ in place of $(NH_4)_2CO_3$ to dissolve zinc and $CO_2$ is blown into the resultant solution, a zinc carbonate may be obtained. However, the obtained zinc carbonate is jelly-like and the impurities adhering thereto are difficult to remove.

In the dissolution of zinc, the concentration of the dissolving liquid is important. It is preferred that the concentration of each of $NH_4OH$ and $(NH_4)_2CO_3$ be 5 to 40 wt %, especially 10 to 30 wt %. The reason is referred to in Japanes Patent Application Laid-Open No. 59-88319 as cited before.

EXAMPLE 1

Zn-containing dust having a Zn content of 97%, which had been discharged from an iron mill, was subjected to dissolution using the equipment as illustrated in FIG. 3.

The Zn-containing dust contained 99% of Zn in terms of metal zinc with oxygen of ZnO removed, 0.14% of Fe. 0.68% of Pb, 0.05% of Cd and others.

The concentrations of the respective components at the outlets of the first to the fourth precipitation-separating tanks are shown in Table 1. The unit is ppm.

TABLE 1

|  |  | First | Second | Third | Fourth |
|---|---|---|---|---|---|
| In solution | Pb | 46 | 10 | <1 | <1 |
|  | Fe | 15 | 6 | 4 | <1 |
| In undissolved residue | Pb | 74 | 6.66 | 2.19 | 1.13 |
|  | Fe | 16.4 | 1.46 | 0.48 | 0.25 |
|  | Zn | 4.5 | 91.4 | 97.1 | 98.5 |

It can be seen from the results shown in Table 1 that a Zn solution having low impurity contents, i.e. less than 1 ppm of Fe and Pb can be obtained by the present invention. The contents of Cd, As, Sn, Sb, etc. were also less than 1 ppm.

COMPARATIVE EXAMPLE 10 kg of metal zinc having a purity of 99 % was fed into 1 m$_3$ of a zinc solution in an apparatus of FIG. 6 and vigorously stirred at a temperature of 40° C. The change, with time, in the amount of heavy metals in the solution was measured and the results are shown, by ppm, in Table 2.

TABLE 2

|  | Fe | Pb | Cd |
|---|---|---|---|
| Starting Zn solution | 6 | 1.56 | 0.18 |
| After 30 min | 2.3 | 0.21 | 0.05 |
| After 60 min | 1.91 | 0.18 | 0.05 |
| After 90 min | 1.81 | 0.15 | 0.03 |
| After 120 min | 1.36 | 0.19 | 0.03 |

EXAMPLE 2

A zinc solution having a composition substantially the same as that used in Comparative Example was purified by the system arrangement as illustrated except that only two ion-exchanging tanks were used.

The volume of each of the ion-exchanging tank was 3.2 m$^3$, the feeding rate of the zinc solution was 2 m$^3$/Hr, the amount of metal zinc added was 10 kg/Hr and the concentration of the reaction mixture slurry was 33 kg/m$^3$. The resultant purified solution has the following formation.

TABLE 3

|  | Fe | Pb | Cd | Ni | Sn | As | Sb |
|---|---|---|---|---|---|---|---|
| Contents | 0.67 | 0.11 | 0.03 | Tr | Tr | Tr | Tr |

It is apparent from the result shown in Table 3 that the purification efficiency is much increased as compared with Comparative Example.

We claim:

1. A system for recovering purified zinc from a solid starting material containing zinc and impurities, comprising:

a multi-stage dissolving arrangement for selectively dissolving the zinc values of the starting material, said dissolving arrangement comprising a plurality of dissolving tanks connected in series, countercurrent flow relationship, means for feeding a dissolving liquid into the first dissolving tank of the series, the dissolving liquid being capable of selectively dissolving the zinc values of the starting material, means for feeding the starting material to the final dissolving tank of the series and first conduit means connecting said dissolving tanks so that the dissolving liquid containing dissolved zinc flows in series from said first dissolving tank to said final dissolving tank and a slurry of non-dissolved material flows in series from said final dissolving tank to said first dissolving tank, whereby the dissolving liquid and the starting material flow counter-currently to each other through said series of dissolving tanks and are mixed together in said dissolving tanks so that the dissolving liquid becomes progressively selectively enriched with zinc values and the remainder of the solid starting material becomes freed of zinc values;

a precipitation-separation tank and second conduit means connecting said precipitation-separation tank to the final dissolving tank so that the dissolving liquid enriched with zinc values that is discharged from the final dissolving tank of the series is flowed into said precipitation-separation tank, said precipitation-separation tank being effective to separate solids that are entrained in the dissolving liquid from the remainder of the dissolving liquid, whereby to produce a purified dissolving liquid enriched with zinc values;

a multi-stage ion-exchanging arrangement for separating heavy metal ions from the purified dissolving liquid, said ion-exchanging arrangement comprising a plurality of ion-exchange tanks connected in series, countercurrent flow relationship, each having a precipitating portion and a clarifying portion, means for feeding the purified dissolving liquid from said precipitation-separation tank into the first ion-exchanging tank of the series and means for feeding particles of zinc metal into the final ion-exchanging tank of the series, said particles of zinc metal being effective to precipitate heavy metals contained in the purified dissolving liquid, and third conduit means connecting said ion-exchange tanks so that the purified dissolving liquid flows in series from said first ion-exchange tank to said final ion-exchange tank and a slurry of non-dissolved material flows in series from said final ion-exchange tank to said first ion-exchange tank, whereby the purified dissolving liquid and the precipitated heavy metals flow countercurrently to each other through the series of ion-exchanging tanks and the purified dissolving liquid becomes progresively freed of the heavy metals.

2. A system as claimed in claim 1, wherein each of said dissolving tanks and ion-exchanging tanks includes a draft tube having an upper end located under the surface of the solution in the tank and a lower end located above the bottom of the tank, an agitator disposed within the draft tube and a baffle member extending from above the surface of the solution to below the surface of the solution and disposed between said draft tube and the inner wall of the tank to define a clarifying zone therebetween, and an overflow passage extending from the clarifying zone so that the solution entering the clarifying zone is transferred to the succeeding tank.

3. A system as claimed in claim 1, wherein each of said dissolving and ion-exchange tanks has an agitator therein for stirring the contents of the tank and the solids therein are separated from the dissolving liquid by settling;

each of said dissolving and ion-exchange tanks has an overflow tube at the upper end thereof for discharging the dissolving liquid and an underflow tube at the lower end thereof for discharging a slurry containing the non-dissolved material, said overflow tube being connecting to the next following tank in the series and said underflow tube being connected to the next preceding tank in the series; and said precipitation-separation tank is a non-stirred tank so that the solids therein settle to the bottom thereof, and an underflow conduit extending from said precipitation-separation tank to said final dissolving tank for returning the solids from said precipitation-separation tank to said final dissolving tank.

4. A system as claimed in claim 3, including a final non-stirred precipitation-separation tank connected in series with and following said final ion-exchange tank, means for discharging the dissolving liquid enriched with zinc from the upper end of said final precipitation-separation tank and means for feeding a slurry of non-dissolved material from the bottom of said final precipitation-separation tank to said final ion-exchange tank.

5. A system as claimed in claim 4, including means for venting gas from said dissolving tanks and said precipitaton-separation tank.

6. A system for recovering purified zinc from a solid starting material containing zinc and impurities, comprising:

a multi-stage dissolving arrangement for selectively dissolving the zinc values of the starting material, said dissolving arrangement comprising a plurality of unit dissolving apparatuses each comprising a dissolving tank and a precipitation-separation tank connected in series with said dissolving tank, said unit dissolving apparatuses being connected in series, countercurrent flow relationship, means for feeding a dissolving liquid into the dissolving tank of the first unit dissolving apparatus of the series, the dissolving liquid being capable of selectively dissolving the zinc values of the starting material, means for feeding starting material to the dissolving tank of the final unit dissolving apparatus of the series, first conduit means connecting each dissolving tank with its assocated precipitation-separation tank and connecting each precipitation-separation tank with the dissolving tank in the next following unit dissolving apparatus so that the dissolving liquid flows in series from the dissolving tank of the first unit dissolving apparatus to the precipitation-separation tank of the final unit dissolving apparatus, and second conduit means for feeding a slurry of non-dissolved material in series from the precipitation-separation tank of the final unit dissolving apparatus to the dissolving tank of the first unit dissolving apparatus, whereby the dissolving liquid and the starting material flow countercurrently to each other through the series of unit dissolving apparatuses so that the dissolving liquid becomes progressively selectively enriched with zinc values and the remainder of the solid starting material becomes freed of zinc values;

each of said precipitation-separation tanks having an inlet connected for receiving the dissolving liquid enriched with zinc values that is discharged from its associated dissolving tank, said precipitation-separation tanks being effective to separate solids that are entrained in the dissolving liquid from the remainder of the dissolving liquid, whereby to produce a purified dissolving liquid enriched with zinc values;

a multi-stage ion-exchanging arrangement for separating heavy metal ions from the purified dissolving liquid, said ion-exchanging arrangement comprising a plurality of ion-exchange tanks connected in series, countercurrent flow relationship, each having a precipitating portion and a clarifying portion, means for feeding the dissolving liquid from the precipitation-separation tank of the final unit dissolving apparatus into the first ion-exchanging tank of the series and means for feeding particles of zinc metal into the final ion-exchanging tank of the series, said particles of zinc metal being effective to precipitate heavy metals contained in the purified dissolving liquid and third conduit means connecting said ion-exchange tanks so that the dissolving liquid flows in series from said first ion-exchange to said final ion-exchange tank and a slurry of non-dissolved material flows in series from said final ion-exchange tank to said first ion-exchange tank, whereby the dissolving liquid and the precipitated heavy metals flow countercurrently to each other through the series of ion-exchanging tanks and the purified dissolving liquid becomes progressively freed of the heavy metals.

7. A system as claimed in claim 6, including conduits for feeding the undissolved materials precipitated in the bottom portions of the precipitation-separating tanks and the dissolving tanks of the unit dissolving apparatuses, except for the first one, to the dissolving tanks of the respectively Preceding unit dissolving apparatuses.

8. A system as claimed in claim 6, wherein each of said dissolving and ion-exchange tanks has an agitator therein for stirring the contents of the tank and the solids therein are separated from the dissolving liquid by settling, said precipitation-separation tanks being non-stirred tanks so that the solids therein settle to the bottom thereof, each of said dissolving and ion-exchange tanks has an overflow tube at the upper end thereof for discharging the dissolving liquid, each of said precipitation-separation tanks has an overflow tube at the upper end thereof for discharging the dissolving liquid and an underflow tube at the lower end thereof for discharging a slurry containing the non-dissolved material, said overflow tubes of said dissolving tanks being connected to the precipitation-separation tank of the same unit dissolving apparatus, said overflow tubes of said precipitation-separation tanks being connected to the dissolving tank of the next following unit dissolving appartus in the series and said underflow tubes being connected to the dissolving tank in the next preceding unit dissolving apparatus in the series.

9. A system as claimed in claim 8, including a final non-stirred precipitation tank connected in series with and follwing said final ion-exchange tank, means for discharging the dissolving liquid enriched with zinc from the upper end of said final precipitation-separation tank and means for feeding a slurry of non-dissolved material from the bottom of said final precipitation-separation tank to said final ion-exchange tank.

10. A system as claimed in claim 9, including means for venting gas from and dissolving tanks and said precipitation-separation tanks.

* * * * *

UNITED STATES PATENT AND TRADEMARK OFFICE
CERTIFICATE OF CORRECTION

PATENT NO. : 4 689 146

DATED : August 25, 1987

INVENTOR(S) : Tatsushi KASAI et al

It is certified that error appears in the above-identified patent and that said Letters Patent is hereby corrected as shown below:

Column 12, line 32; change "Preceding" to ---preceding---.

line 56; change "follwing" to ---following---.

line 63; change "and" (first occurrence) to ---said---.

Signed and Sealed this

First Day of March, 1988

Attest:

DONALD J. QUIGG

Attesting Officer

Commissioner of Patents and Trademarks